G. DIETZ.
FOCUS FINDER.
APPLICATION FILED APR. 23, 1910.
997,377.
Patented July 11, 1911.
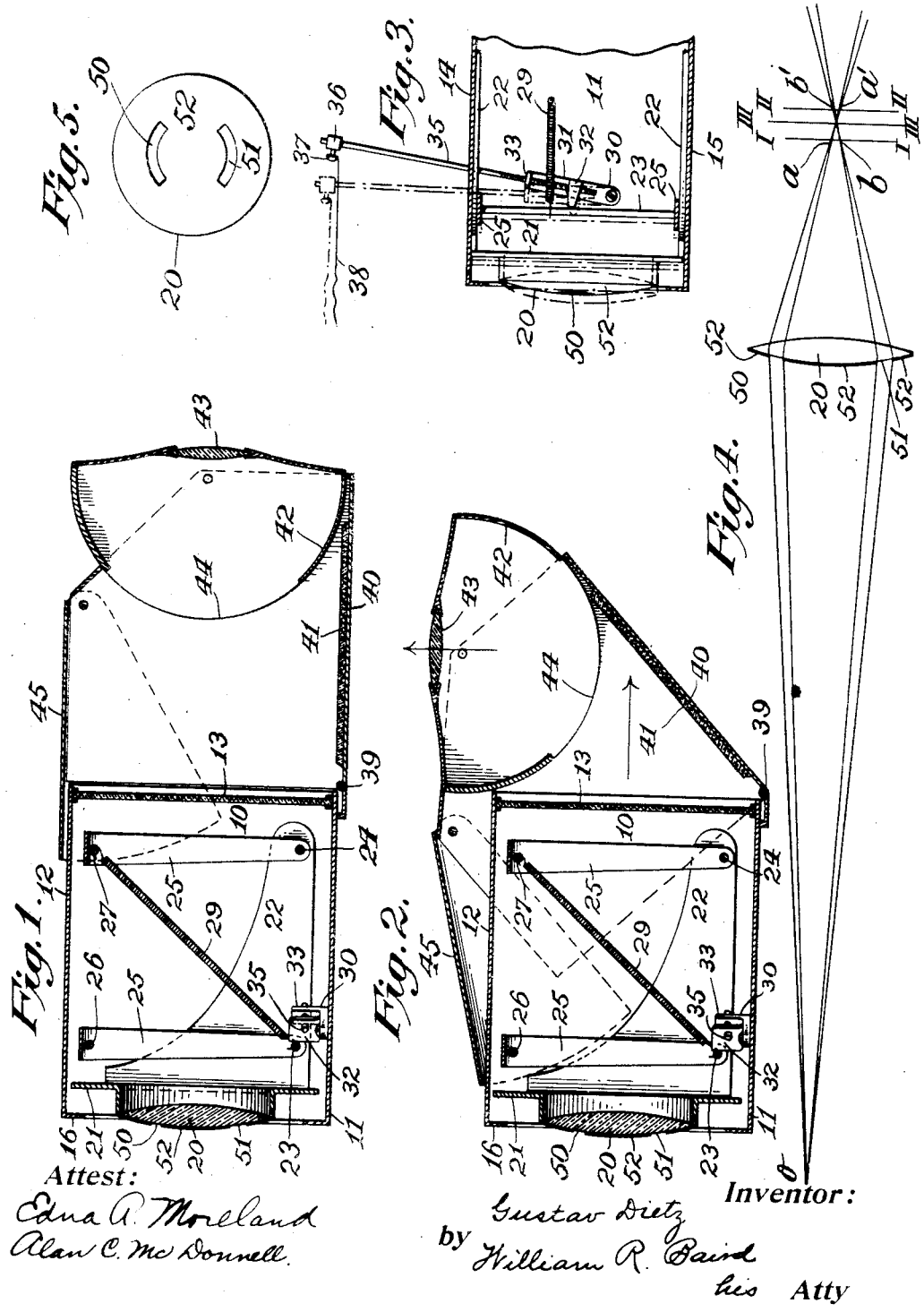
Attest:
Edna A. Moreland
Alan C. McDonnell.
Inventor:
Gustav Dietz
by William R. Baird
his Atty

UNITED STATES PATENT OFFICE.

GUSTAV DIETZ, OF YONKERS, NEW YORK, ASSIGNOR TO THE MULTI SPEED SHUTTER COMPANY, OF NEW YORK, N. Y., A CORPORATION OF NEW YORK.

FOCUS-FINDER.

997,377. Specification of Letters Patent. Patented July 11, 1911.

Application filed April 23, 1910. Serial No. 557,138.

*To all whom it may concern:*

Be it known that I, GUSTAV DIETZ, a citizen of the United States, residing at Yonkers, in the county of Westchester and State of New York, have invented certain new and useful Improvements in Focus-Finders, of which the following is a specification.

This invention relates to focus finders for photographic cameras and its novelty consists in the construction and adaptation of the parts as will be more fully hereinafter pointed out.

The object of the invention is to provide a lens system with a focus finder which comprises a large aperture lens of small focus, and to this end means are provided for cutting out all of the center rays of the finder lens and utilizing the marginal ones, whereby when the images formed by the rays coming through a plurality of concentric segments coincide upon the ground glass screen the operator is assured that the focus has been found.

In the drawings Figure 1 is a vertical central section through a preferred form of apparatus embodying the invention. Fig. 2 is a similar view showing the means provided for viewing the ground glass screen from a position at an angle. Fig. 3 is a horizontal section and partial plan view of the front part of the lens frame, Fig. 4 is a diagrammatic representation illustrating the path of the light rays in finding a focus, and Fig. 5 is a front view of a lens provided with two light admitting openings.

In the drawings, 10 is a box having a bottom 11, a top 12, a rear wall 13 made of a ground glass screen, side walls 14 and 15 and a front 16 suitably apertured to permit of the movement of the lens frame therethrough.

The lens frame comprises a lens 20 of large aperture and small focus secured in a front board 21 in any approved manner and the front board is in turn secured on each side to side wings 22, 22, mounted upon lower cross rods 23 and 24 suspended between pairs of hangers 25, 25 supported to swing upon upper cross rods 26, and 27 between the side walls 14 and 15. The front board is necessarily larger than the aperture in the front of the box 10.

By the construction stated there is formed within the box 10 a lens frame which can when moved cause the lens 20 to be moved relatively to the screen 13. A spring 29 secured to any fixed part of the box and any part of the swinging frame assists in retracting the lens to position when it has been moved forward.

Projecting upwardly from the bottom 11 of the box 10 is a lug 30 to which is pivoted a holder 31 provided with brackets 32 and 33 suitably threaded and adapted to receive the threaded end 34 of an operating lever 35 provided at its other extremity with a collar 36 and set screw 37. The bracket 32 is extended toward the front of the box to contact with the cross rod 23. When the operating lever 35 is moved from the position shown in full line to the position shown in dotted line in Fig. 3, the cross rod 23 and the swinging frame will consequently be moved forward against the tension of the spring 29 which will automatically retract it to position after such movement.

A string or other suitable flexible connection indicated at 38 is secured to the collar 36, or any other part of the operating lever, and to the front board of the camera (not shown) on which the device is to be used. Obviously if the camera lens board is moved forward, the force exerted on the connection 38 will, through the parts described, move the swinging frame and lens 20 forward also and any desired relative movement of the camera lens and finder lens 20 can be secured by adjusting the connection 38 along the operating lever 35 by means of the collar 36 and set screw 37 or otherwise, so that the same finder lens may be used with camera lenses of different focal lengths.

At the rear of the box 10 is hinged at 39 a collapsible extension having a bottom member 40 provided on its inner surface with a mirror 41, a semi-cylindrical holder 42 provided with a magnifying lens 43 and with a large light opening 44 at its front and with a light excluding curtain 45 arranged to engage the top and sides of the box 10.

The lens 20 is provided near its margin with a plurality of light admitting segments 50, 51, the remainder of the surface of the lens being coated with some suitable light excluding material indicated at 52. It is preferable that the light admitting segments should be concentric with the center of the lens and symmetrically disposed around such center at substantially the same radial distance. By this construction rays falling on the center of the lens are cut out and only the rays falling near the margin are allowed to form an image.

In Fig. 4 there is shown a diagram of the path of the rays of light coming from an object O and impinging upon the two light admitting segments 50 and 51 of the lens. If the vertical line I represents the position of the ground glass screen 13, it is seen that two distinct images of the object O would be formed on the screen at $a$ and $b$. While if the vertical line II represents the position of the ground glass screen then two similar distinct images of the object O would be formed at $a'$ and $b'$. That is, the more distant the object O is from the focal plane of the lens the more these images $a$ and $b$ and $a'$ and $b'$ will spread apart. Therefore it is only necessary to move the lens 20 with respect to the ground glass screen 13 or vice versa until the different images of the same object coincide, and all fall into one clear and sharp image, in order to determine the proper focal plane which in the diagram is indicated by the vertical line III. If the parts are arranged as shown in Figs. 1 and 3 and the front board of the camera is moved to focus upon the object to be photographed, the connection 38 moves the operating lever 35 and the bracket 32 pressing against the rod 23 moves forward the swinging frame carrying the lens 20 and if the finder lens 20 and the camera lens have been properly adjusted with respect to each other through the connection 38, it is obvious that as soon as the image on the ground glass screen 13 ceases to be blurred and double and becomes clear, sharp and single, then the finder lens and necessarily the camera lens is in focus. When the parts are arranged as shown in Fig. 1, the ground glass screen being vertical and the glass 43 being vertical it would be necessary for the operator to view the image on the screen 13 while looking in a horizontal direction. If it is desired to view the image from an angle for instance from above, the collapsible extension is tilted as shown in Fig. 2. The rays falling upon and passing through the screen 13 are then reflected upward from the surface of the mirror 41 and viewed through the glass 43.

For simplicity of illustration the lens 20 is shown as a simple lens with two light admitting segments, but in practice a more elaborate and better lens system would be employed and probably a larger number of light admitting segments, but this would constitute no departure from the principle of the invention.

What I claim as new is:—

1. A focus finding device comprising a box, a lens, an opaque shield in front of the same provided with segmental openings near the margin of the lens, means for moving the lens and shield forward and means for moving the lens and shield backward with respect to the front of the box, one of the moving means being automatic.

2. A focus finding device comprising a box, a lens, an opaque shield in front of the same provided with segmental openings near the margin of the lens, means for moving the lens and shield forward, and means for moving the lens and shield backward with respect to the front of the box, the backwardly moving means being automatic and consisting of a spring put under tension when the lens is moved forward.

3. A focus finding device comprising a box, a frame movable therein, a lens in the frame, means for positively moving the frame in one direction, means for automatically moving it in the opposite direction, and means for shielding the lens from the light except at predetermined points near its margin.

4. A focus finder comprising a box having its sides, top and bottom of opaque material, a rear wall consisting of a glass screen, a front board on which is mounted a lens, and means for moving the front board and lens with respect to the screen consisting of a lever adjustable in effective length, whereby it may be moved forward, and a spring for moving it backward.

5. A box having a rear wall of translucent material, a focus finding lens mounted in a hanging frame in front of the same, and means for moving the frame in one direction comprising a lever.

6. A box having a rear wall of translucent material, a focus finding lens mounted in a hanging frame in front of the same, and means for moving the frame in one direction comprising a lever, and means for varying its effective length.

7. A box having a rear wall of translucent material, a focus finding lens mounted in a hanging frame in front of the same, means for moving the frame in one direction, comprising a lever, and means for moving the frame in the opposite direction comprising a spring secured to the frame and to a fixed point within the box.

8. A box having a rear wall of translucent material, a focus finding lens mounted in a hanging frame in front of the same, and means for moving the frame in one direction comprising a lever, in combination with means for stopping out the light from the front of the lens except in a plurality of marginal segments.

9. A box having a rear wall of translucent material, a focus finding lens mounted in a hanging frame in front of the same, and means for moving the frame in one direction comprising a lever of adjustable length, in combination with means for stopping out the light from the front of the lens except in a plurality of marginal segments.

10. A box having a rear wall of translucent material, a focus finding lens mounted in a hanging frame in front of the same, means for moving the frame in one direction comprising a lever and means for moving the frame in the opposite direction comprising a spring secured to the lens frame and to a fixed point within the box, in combination with means for stopping out the light from the front of the lens except in a plurality of marginal segments.

11. A box having a rear wall of ground glass, two pairs of hangers hinged to the side walls of the box, a frame work comprising a front board secured to the hangers, a focus finding lens mounted in the front board, a lever fulcrumed at the bottom of the box and extending outside of the same and adapted to be moved against the front board and means for retracting the front board after such movement.

12. A box having a rear wall of translucent material, a focus finding lens mounted in a hanging frame in front of the same, means for moving the frame toward and means for moving it from the rear wall comprising a lever, and a magnifying glass mounted back of such wall.

13. A box having a rear wall of translucent material, a focus finding lens mounted in a hanging frame in front of the same, means for moving the frame in one direction comprising a lever, means for moving the frame in the opposite direction, a magnifying glass mounted back of such wall and means for moving the magnifying glass to various angles with said wall.

14. A box having a rear wall of translucent material, a focus finding lens mounted in a hanging frame in front of the same, means for moving the frame in one direction comprising a lever, means for moving the frame in the opposite direction, a magnifying glass mounted back of such wall and means for moving it to various angles therewith, in combination with a reflecting optical element for throwing the image formed on the rear wall to the glass when arranged at such an angle.

15. A focus finder comprising a rear wall of translucent material, a focus finding lens arranged in front of the same, means for moving the lens to and fro, a collapsible extension secured beyond the rear wall provided with a magnifying lens for sharp focussing, and a mirror for reflecting the image from the screen to such glass.

In testimony whereof I affix my signature in presence of two witnesses.

GUSTAV DIETZ.

Witnesses:
CHARLES G. KELLER,
ELIZABETH L. PEEBLES.